(12) United States Patent
Shimizu et al.

(10) Patent No.: US 12,502,849 B2
(45) Date of Patent: Dec. 23, 2025

(54) METHOD FOR MANUFACTURING COMPOSITE STRUCTURE, AND LAMINATE

(71) Applicant: MITSUBISHI HEAVY INDUSTRIES, LTD., Tokyo (JP)

(72) Inventors: Masahiko Shimizu, Tokyo (JP); Homare Yamato, Tokyo (JP); Toshiki Kitazawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/773,836

(22) PCT Filed: Jan. 17, 2020

(86) PCT No.: PCT/JP2020/001587
§ 371 (c)(1),
(2) Date: May 2, 2022

(87) PCT Pub. No.: WO2021/144990
PCT Pub. Date: Jul. 22, 2021

(65) Prior Publication Data
US 2022/0371291 A1 Nov. 24, 2022

(51) Int. Cl.
*B29C 70/20* (2006.01)
*B29C 70/46* (2006.01)
(Continued)

(52) U.S. Cl.
CPC .......... *B29C 70/46* (2013.01); *B29C 70/205* (2013.01); *B29K 2307/04* (2013.01); *B29K 2309/08* (2013.01); *B29L 2007/002* (2013.01)

(58) Field of Classification Search
CPC .............................. B29C 70/205; B29C 70/00
See application file for complete search history.

(56) References Cited

U.S. PATENT DOCUMENTS 3,086,576 A * 4/1963 Thaden ................. B29B 15/125
174/95
3,121,451 A * 2/1964 Schuerch .............. B29C 70/205
220/62.19
(Continued)

FOREIGN PATENT DOCUMENTS

EP 2018950 A1 1/2009
JP H03126532 A 5/1991
(Continued)

OTHER PUBLICATIONS

Office Action for Japanese Application No. 2021-570624 mailed Feb. 14, 2023; 6pp.
(Continued)

*Primary Examiner* — Andrew D Graham
(74) *Attorney, Agent, or Firm* — HAUPTMAN HAM, LLP

(57) ABSTRACT

The purpose of the present invention is to further enhance the strength of a manufactured composite structure by further suppressing the occurrence of wrinkling. A method for manufacturing a composite structure, the method comprising: a lamination step for layering a plurality of fiber sheets and molding a plate-form laminate; a forming step for forming a recess formed by a curved surface in a prescribed portion of the laminate; a short-direction deformation step for deforming the laminate in the short direction thereof after the forming step to configure a long-direction cross-section of the laminate in a prescribed shape; and a long-direction deformation step for deforming the laminate in the long direction after the forming step, so that the recess formed in the forming step deforms, to configure a short-direction cross section in a prescribed shape.

6 Claims, 13 Drawing Sheets

(51) Int. Cl.
  *B29K 307/04* (2006.01)
  *B29K 309/08* (2006.01)
  *B29L 7/00* (2006.01)

(56) References Cited

U.S. PATENT DOCUMENTS

| | | | | |
|---|---|---|---|---|
| 3,270,103 | A * | 8/1966 | Kurtz | B29C 44/1276 |
| | | | | 264/46.7 |
| 4,955,970 | A * | 9/1990 | Kivi | B29C 70/86 |
| | | | | 285/239 |
| 4,990,207 | A * | 2/1991 | Sakai | B29C 70/345 |
| | | | | 156/263 |
| 5,356,692 | A * | 10/1994 | Perez | B29C 70/16 |
| | | | | 428/116 |
| 6,114,012 | A | 9/2000 | Amaoka et al. | |
| 6,355,133 | B1 * | 3/2002 | Williams | B29C 70/205 |
| | | | | 156/286 |
| 7,186,361 | B2 * | 3/2007 | Kasai | B29C 70/50 |
| | | | | 264/296 |
| 7,943,076 | B1 * | 5/2011 | Hawkins | B29C 70/545 |
| | | | | 156/196 |
| 9,440,401 | B1 * | 9/2016 | Nelson | B29C 70/543 |
| 2007/0257267 | A1 | 11/2007 | Leatherdale et al. | |
| 2008/0023127 | A1 * | 1/2008 | Misciagna | B29C 70/205 |
| | | | | 156/169 |
| 2011/0135886 | A1 * | 6/2011 | Winter | B29C 70/504 |
| | | | | 428/178 |
| 2013/0243992 | A1 * | 9/2013 | Tanaka | B64C 3/20 |
| | | | | 428/58 |
| 2014/0037778 | A1 | 2/2014 | Winter et al. | |
| 2014/0363613 | A1 * | 12/2014 | Lazur | F01D 25/005 |
| | | | | 428/101 |
| 2015/0210018 | A1 * | 7/2015 | Lang | B29B 11/16 |
| | | | | 425/508 |
| 2015/0321441 | A1 * | 11/2015 | Marcoe | D04C 1/06 |
| | | | | 156/149 |
| 2016/0016382 | A1 * | 1/2016 | Ishikawa | B29B 15/08 |
| | | | | 156/324 |
| 2016/0176121 | A1 * | 6/2016 | Jaiswal | B29C 70/30 |
| | | | | 156/221 |
| 2016/0194468 | A1 * | 7/2016 | Ogasawara | B29B 15/08 |
| | | | | 524/495 |
| 2016/0332413 | A1 * | 11/2016 | Kismarton | B32B 37/18 |
| 2017/0320273 | A1 * | 11/2017 | Peeters | B29C 53/48 |
| 2018/0029313 | A1 * | 2/2018 | Laberge Lebel | B29C 70/205 |
| 2018/0222128 | A1 * | 8/2018 | Tomioka | B29C 43/48 |
| 2018/0297320 | A1 * | 10/2018 | Fujita | B29C 70/10 |
| 2019/0111636 | A1 * | 4/2019 | Van Nieuwenhove | B29C 70/38 |
| 2019/0160763 | A1 * | 5/2019 | Morishima | B29D 99/0005 |
| 2019/0232528 | A1 * | 8/2019 | Tsuda | C08J 5/243 |
| 2019/0275750 | A1 * | 9/2019 | Parkinson | B29C 70/24 |
| 2020/0039111 | A1 * | 2/2020 | Tsumura | B29B 11/16 |
| 2020/0340528 | A1 * | 10/2020 | Gurvich | B29C 70/86 |
| 2020/0353699 | A1 * | 11/2020 | Cheng | B29C 70/202 |
| 2020/0353712 | A1 * | 11/2020 | Cheng | B32B 5/12 |
| 2020/0353715 | A1 * | 11/2020 | Cheng | B32B 5/26 |

FOREIGN PATENT DOCUMENTS

| | | |
|---|---|---|
| JP | H10258463 A | 9/1998 |
| JP | H10315339 A | 12/1998 |
| JP | 2006335049 A | 12/2006 |
| JP | 2010046956 A | 3/2010 |
| JP | 2011528291 A | 11/2011 |
| WO | 9915323 A1 | 4/1999 |

OTHER PUBLICATIONS

International Search Report and Written Opinion of International Application No. PCT/JP2020/001587 mailed Mar. 24, 2020; 12pp.
Extended European Search Report of European Application No. 20914510.1 mailed Sep. 23, 2022; 8pp.

* cited by examiner

| No. | H | L | ΔL |
|---|---|---|---|
| 0 | 0 | 0 | 0 |
| 1 | $0.1H_{10}$ | $0.1L_{10}$ | $0.1\Delta L_{10}$ |
| 2 | $0.2H_{10}$ | $0.2L_{10}$ | $0.2\Delta L_{10}$ |
| 3 | $0.3H_{10}$ | $0.3L_{10}$ | $0.3\Delta L_{10}$ |
| 4 | $0.4H_{10}$ | $0.4L_{10}$ | $0.4\Delta L_{10}$ |
| 5 | $0.5H_{10}$ | $0.5L_{10}$ | $0.5\Delta L_{10}$ |
| 6 | $0.6H_{10}$ | $0.6L_{10}$ | $0.6\Delta L_{10}$ |
| 7 | $0.7H_{10}$ | $0.7L_{10}$ | $0.7\Delta L_{10}$ |
| 8 | $0.8H_{10}$ | $0.8L_{10}$ | $0.8\Delta L_{10}$ |
| 9 | $0.9H_{10}$ | $0.9L_{10}$ | $0.9\Delta L_{10}$ |
| 10 | $H_{10}$ | $L_{10}$ | $\Delta L_{10}$ |

FIG. 12

| No. | H | L | $\Delta L$ |
|---|---|---|---|
| 0 | 0 | $L_{10}$ | 0 |
| 1 | $0.241 H_{10}$ | $L_{10}$ | $0.1 \Delta L_{10}$ |
| 2 | $0.355 H_{10}$ | $L_{10}$ | $0.2 \Delta L_{10}$ |
| 3 | $0.451 H_{10}$ | $L_{10}$ | $0.3 \Delta L_{10}$ |
| 4 | $0.538 H_{10}$ | $L_{10}$ | $0.4 \Delta L_{10}$ |
| 5 | $0.621 H_{10}$ | $L_{10}$ | $0.5 \Delta L_{10}$ |
| 6 | $0.701 H_{10}$ | $L_{10}$ | $0.6 \Delta L_{10}$ |
| 7 | $0.778 H_{10}$ | $L_{10}$ | $0.7 \Delta L_{10}$ |
| 8 | $0.853 H_{10}$ | $L_{10}$ | $0.8 \Delta L_{10}$ |
| 9 | $0.927 H_{10}$ | $L_{10}$ | $0.9 \Delta L_{10}$ |
| 10 | $H_{10}$ | $L_{10}$ | $\Delta L_{10}$ |

(a)

(b)

RECESSED PORTION

METHOD FOR MANUFACTURING COMPOSITE STRUCTURE, AND LAMINATE

RELATED APPLICATIONS

The present application is a National Phase of International Application Number PCT/JP2020/001587 filed Jan. 17, 2020.

TECHNICAL FIELD

The present disclosure relates to a method for manufacturing a composite structure and to a laminate.

BACKGROUND ART

A stringer is one of main structures used in an aircraft. The stringer is a long component in which a cross-sectional shape is provided to a cross section in a longitudinal direction and which is curved or bent along the longitudinal direction. Such a stringer may be manufactured by deforming a laminate having a plate shape formed by laminating a plurality of fiber sheets (for example, PTL 1). In this case, processing for deforming a cross section in the longitudinal direction into a predetermined shape and processing for curving or bending the laminate in the longitudinal direction need to be performed on the laminate having a plate shape.

PTL 1 discloses a method in which a recess and a projection are formed in a laminate having a flat plate shape using mandrels each having a non-planar surface, and then the laminate is subjected to processing for deforming a cross section in a longitudinal direction into a predetermined shape and to processing for curving or bending the laminate in the longitudinal direction.

CITATION LIST

Patent Literature

[PTL 1] U.S. Pat. No. 9,440,401

SUMMARY OF INVENTION

Technical Problem

When a laminate having a plate shape is subjected to processing for deforming a cross section in a longitudinal direction into a predetermined shape and to processing for curving or bending the laminate in the longitudinal direction (hereinafter, referred to as "deformation processing"), since the laminate is difficult to elongate and contract in an extending direction of fibers of fiber sheets, a load may act on an unintended portion during the deformation processing to cause wrinkles. The generation of wrinkles may reduce the strength of a composite structure manufactured by processing the laminate.

In PTL 1, a non-planar portion (a recess and a projection) is formed in the laminate having a flat plate shape, and then the laminate is subjected to deformation processing. In such a manner, the laminate in which the non-planar portion is formed is prepared in advance, and the laminate is subjected to deformation processing in a state where the laminate is elongated, so that the generation of wrinkles may be suppressible.

However, in PTL 1, the shape of the non-planar portion formed in the laminate is not taken into consideration. In a case where the non-planar portion including a rapidly changing portion such as a flexed portion or a bent portion is formed in the laminate, when the laminate is subjected to deformation processing, wrinkles may be generated due to the flexed portion or the like.

In addition, a method for laminating fiber sheets on a mold having a non-planar surface can also be considered as a method for forming a laminate including a non-planar portion.

However, in this method, the fiber sheets have to be laminated on the mold having the non-planar surface, so that work of forming the laminate may be complicated.

The present disclosure is conceived in view of such circumstances, and an object of the present disclosure is to provide a method for manufacturing a composite structure in which the generation of wrinkles is further suppressed, so that the strength of the manufactured composite structure can be further improved.

In addition, another object of the present disclosure is to provide a method for manufacturing a composite structure capable of simplifying a step of molding a laminate, and a laminate.

Solution to Problem

In order to solve the above problems, a method for manufacturing a composite structure and a laminate of the present disclosure adopt the following means.

According to one aspect of the present disclosure, there is provided a method for manufacturing a composite structure, the method including: a lamination step of molding a laminate having a plate shape by laminating a plurality of fiber sheets; a forming step of forming a recessed portion or a projecting portion formed by a curved surface, in a predetermined portion of the laminate; a lateral deformation step of providing a predetermined shape to a cross section in a longitudinal direction by deforming the laminate in a lateral direction after the forming step; and a longitudinal deformation step of providing a predetermined shape to a cross section in the lateral direction by deforming the laminate in the longitudinal direction to deform the recessed portion or the projecting portion formed in the forming step, after the forming step.

According to another aspect of the present disclosure, there is provided a laminate having a plate shape that is used to form a composite structure in which a cross section in a longitudinal direction has a predetermined shape and a cross section in a lateral direction has a predetermined shape when a predetermined portion of the laminate is deformed, the body including: a plurality of fiber sheets laminated in a thickness direction. A recessed portion or a projecting portion formed by a curved surface is formed in the predetermined portion.

Advantageous Effects of Invention

According to the present disclosure, the generation of wrinkles is further suppressed, so that the strength of the manufactured composite structure can be further improved.

In addition, the step of molding the laminate can be simplified.

BRIEF DESCRIPTION OF DRAWINGS

FIG. 8(a) is a perspective view, and FIG. 8(b) is a view schematically showing a cross section taken along line b-b in FIG. 8(a).

FIG. 12 is a table showing heights (H), lengths (L) in the longitudinal direction, and elongation amounts at segments No. 0 to No. 10 of a recessed portion of FIG. 11.

FIG. 14(a) is a perspective view, and FIG. 14(b) is a view schematically showing a cross section taken along line b-b in FIG. 14(a).

DESCRIPTION OF EMBODIMENTS

Figure 1:
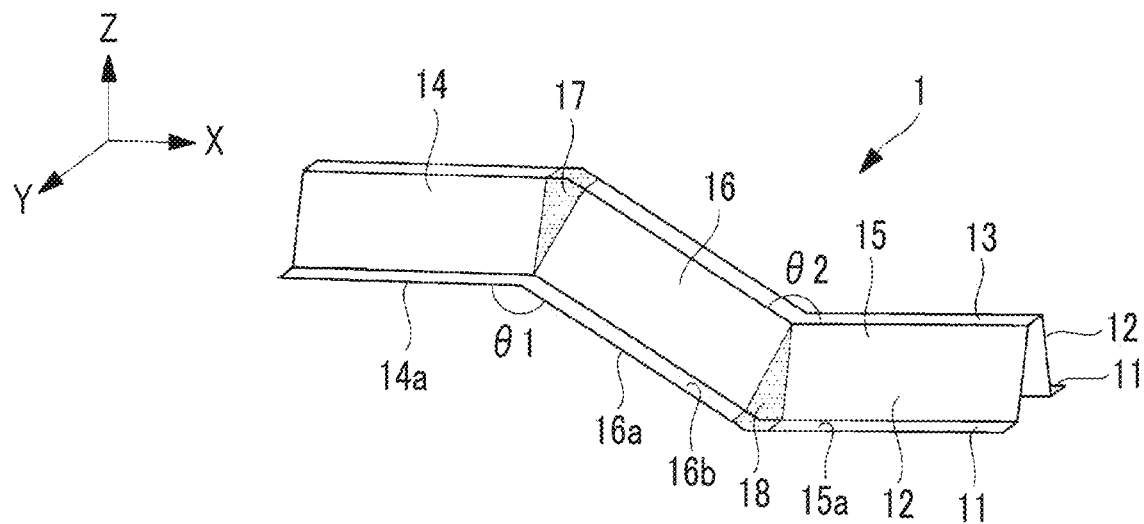
FIG. 1 is a perspective view showing a composite structure according to a first embodiment.

Hereinafter, one embodiment of a method for manufacturing a composite structure and of a laminate according to the present disclosure will be described with reference to the drawings.

First Embodiment

A composite structure 1 according to the present embodiment is manufactured from, for example, a laminate 2 having a plate shape which is formed by laminating fiber sheets 3 infiltrated with a resin. Examples of the composite structure 1 include a stringer used for a fuselage, a main wing, or the like of an aircraft. Incidentally, an example of the fiber sheet 3 is a prepreg.

Incidentally, in the following description, a longitudinal direction of the laminate 2 will be described as an X-axis direction, a lateral direction of the laminate 2 will be described as a Y-axis direction, and a thickness direction of the laminate 2 will be described as a Z-axis direction. In the present embodiment, since an example will be described in which the Z-axis direction is an up-down direction, the Z-axis direction may be described as the up-down direction.

The fiber sheet 3 has a flat sheet shape. One fiber sheet 3 is formed of a fiber preform in which fiber arrangement directions (hereinafter, referred to as "fiber directions") are aligned in one direction, and a resin infiltrated in the fiber preform. Any fiber such as a carbon fiber or a glass fiber is used as the fiber preform. For example, thermosetting resins to be cured by heating, such as epoxy resin, polyimide, polyurethane, and unsaturated polyester can be used as the resin infiltrated in the fiber preform. In addition, thermoplastic resins to be solidified by heating, such as polyamide, polyethylene, polystyrene, and polyvinyl chloride can also be used.

The laminate 2 is molded, for example, by laminating the fiber sheets 3 having different fiber directions. Specifically, the laminate 2 is molded, for example, by arbitrarily laminating the fiber sheets 3 having a fiber direction of 0 degrees, the fiber sheets 3 having a fiber direction of 45 degrees, the fiber sheets 3 having a fiber direction of –45 degrees, and the fiber sheets 3 having a fiber direction of 90 degrees. The pattern of the fiber directions, the number of the fiber sheets 3 in each fiber direction, the lamination order, and the like are appropriately designed according to the specifications of the composite structure 1. For example, the laminate 2 may be molded only from the fiber sheets 3 having a fiber direction of 0 degrees, or the laminate 2 may be molded from the fiber sheets 3 having a fiber direction of 0 degrees and the fiber sheets 3 having a fiber direction of 90 degrees.

Next, a method for manufacturing a composite structure according to the present embodiment will be described.

First, the laminate 2 made of a composite material and having a plate shape is formed by laminating a plurality of the fiber sheets 3 (lamination step). At this time, fibers of the fiber sheets 3 forming the laminate 2 are divided (dividing step). Incidentally, the dividing step may be performed before the lamination step. Namely, the fibers of the fiber sheets 3 may be divided before the fiber sheets 3 are laminated. Next, as for the laminate 2 having a plate shape, a recessed portion and a projecting portion are formed in the laminate 2 (forming step). Next, the laminate is deformed in the lateral direction to provide a predetermined shape to a cross section in the longitudinal direction (lateral deformation step). In addition, the laminate 2 is deformed in the longitudinal direction to provide a predetermined shape to a cross section in the lateral direction (longitudinal deformation step). In such a manner, the composite structure 1 is manufactured. In the deformation step, the recessed portion and the projecting portion are formed to include portions that are curved or bent in the longitudinal deformation step.

Next, a specific method for manufacturing a composite structure will be described. In the present embodiment, as one example, a method for manufacturing the composite structure 1 shown in FIG. 1 will be described.

First, the method for manufacturing the composite structure shown in FIG. 1 will be described.

The composite structure 1 is a long member in which a predetermined cross-sectional shape is provided to a cross section in the longitudinal direction (X-axis direction). In addition, the composite structure 1 is bent at two locations in the longitudinal direction. Namely, a predetermined cross-sectional shape is also provided to a cross section in the lateral direction (Y-axis direction). Incidentally, the cross section in the longitudinal direction means a cross section when the composite structure 1 is cut by a plane orthogonal to the longitudinal direction. In addition, similarly, the cross section in the lateral direction means a cross section when the composite structure 1 is cut by a plane orthogonal to the lateral direction.

The composite structure 1 integrally includes a pair of flange portions 11 that are disposed at both ends in the Y-axis direction to extend in the Y-axis direction, a pair of web portions 12 extending diagonally inward from inner end portions of the flange portions 11 in the Y-axis direction, and a cap portion 13 that connects inner end portions of the pair of web portions 12. Namely, similarly, the cross-sectional shape of the composite structure 1 in the longitudinal direction also includes the flange portion 11, the web portion 12, and the cap portion 13.

In addition, the composite structure 1 integrally includes one end portion 14 that is one end side in the longitudinal direction, the other end portion 15 that is the other end side in the longitudinal direction, and a central portion 16 that connects the one end portion 14 and the other end portion 15. Namely, similarly, the cross-sectional shape of the composite structure 1 in the lateral direction also includes the one end portion 14, the other end portion 15, and the central portion 16. The one end portion 14, the other end portion 15, and the central portion 16 have substantially the same length in the longitudinal direction. The one end portion 14 and the central portion 16 are connected to each other in a bent shape to form a predetermined angle in a cross section in the lateral direction. Hereinafter, a connecting portion between the one end portion 14 and the central portion 16 is referred to as a first bent portion 17. At the first bent portion 17, an angle θ1 formed by a plate surface on one side of the one end portion 14 (lower surface 14a in the present embodiment) and a plate surface on the one side of the central portion 16 (lower surface 16a in the present embodiment) is an obtuse angle. The other end portion 15 and the central portion 16 are connected to each other in a bent shape to form a predetermined angle in a cross section in the lateral direction. Hereinafter, a connecting portion between the other end portion 15 and the central portion 16 is referred to as a second bent portion 18. At the second bent portion 18, an angle θ2 formed by a plate surface on the other side of the other end portion 15 (upper surface 15a in the present embodiment) and a plate surface on the other side of the central portion 16 (upper surface 16b in the present embodiment) is an obtuse angle. The angle θ1 and the angle θ2 are substantially the same. Namely, in the composite structure 1, the one end portion 14 and the other end portion 15 extend substantially parallel to each other, and the one end portion 14 and the other end portion 15 are disposed apart from each other in a predetermined direction (Z-axis direction in the present embodiment). In addition, the central portion 16 connects the one end portion 14 and the other end portion 15.

The composite structure 1 having such a shape is manufactured by the following method.

Figure 2:
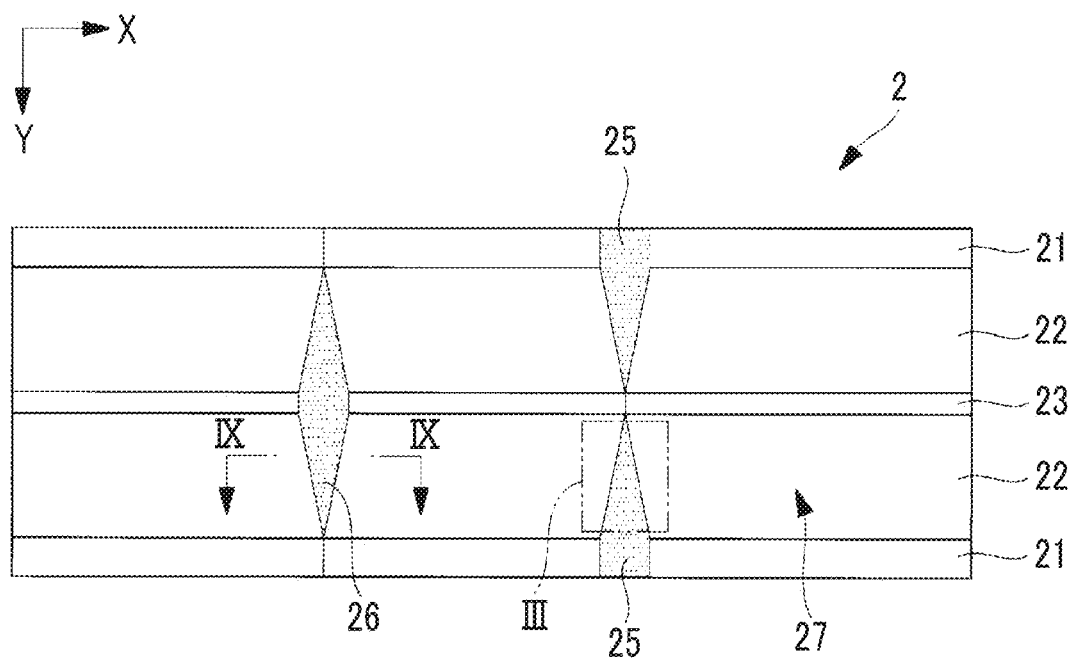
FIG. 2 is a schematic plan view showing a state of the composite structure of FIG. 1 before the composite structure is deformed in a longitudinal direction and in a lateral direction.

First, the laminate 2 made of a composite material and having a flat plate shape is formed by laminating the plurality of fiber sheets 3 as shown in FIG. 2 (lamination step).

The laminate 2 molded in the lamination step has a flat plate shape and conceptually, includes flange corresponding portions 21 that serve as the flange portions 11 when the composite structure 1 is completed (namely, after the longitudinal deformation step and the lateral deformation step are performed), and the like. Specifically, as shown in FIG. 2, the laminate 2 includes the flange corresponding portions 21 that serve as the flange portions 11, web corresponding portions 22 that serve as the web portions 12, and a cap corresponding portion 23 that serves as the cap portion 13, when the composite structure 1 is completed. The flange corresponding portions 21 are provided at both end portions of the laminate 2 in the Y-axis direction over the entire region in the X-axis direction. The cap corresponding portion 23 is provided at a central portion of the laminate 2 in the Y-axis direction over the entire region in the X-axis direction. The web corresponding portion 22 is provided between the flange corresponding portions 21 and the cap corresponding portion 23. The web corresponding portion 22 is provided over the entire region in the X-axis direction.

Next, the forming step will be described. In the forming step, as shown in FIG. 2, a recessed portion 25 and a projecting portion 26 are formed in the laminate 2. Any means may be adopted as means for performing the forming step. For example, the forming step may be performed by pressing the laminate 2 against mandrels corresponding to the recessed portion 25 and to the projecting portion 26. In this case, the recessed portion 25 and the projecting portion 26 are formed at the same time. Incidentally, when the recessed portion 25 and the projecting portion 26 are formed using mandrels, the mandrel for forming the recessed portion 25 and the mandrel for forming the projecting portion 26 may be pressed against the laminate 2 at different timings. Namely, the recessed portion 25 and the projecting portion 26 may not be formed at the same time. In addition, the recessed portion 25 and the projecting portion 26 may be formed by pressing a rotating body such as a roller against a plate surface of the laminate 2. In addition, the recessed portion 25 and the projecting portion 26 may be formed by inflating and pressing a flexible bag-shaped member such as a bladder against the plate surface of the laminate 2. Incidentally, in the following description, a planar portion of the laminate 2 at which the recessed portion 25 and the projecting portion 26 are not formed is referred to as a planar portion 27.

First, the recessed portion 25 will be described. In the forming step of the present embodiment, two recessed portions 25 are formed in predetermined portions of the laminate 2 having a plate shape. The predetermined portions are portions that serve as the second bent portion 18 after the longitudinal deformation step is performed (vicinity of one third from the other end of the laminate 2 in the X-axis direction), and are both end portions of the laminate 2 in the Y-axis direction. Each of the recessed portions 25 is recessed downward. Each of the recessed portions 25 is formed over substantially the entire regions of the flange corresponding portion 21 and of the web corresponding portion 22 in the Y-axis direction. In addition, the two recessed portions 25 are not connected to each other, and the cap corresponding portion 23 that is a part of the planar portion 27 exists between the two recessed portions 25. In such a manner, each of the recessed portions 25 is formed at a position corresponding to the flange portion 11 and to the web portion 12 after the longitudinal deformation step is performed.

Figure 3:
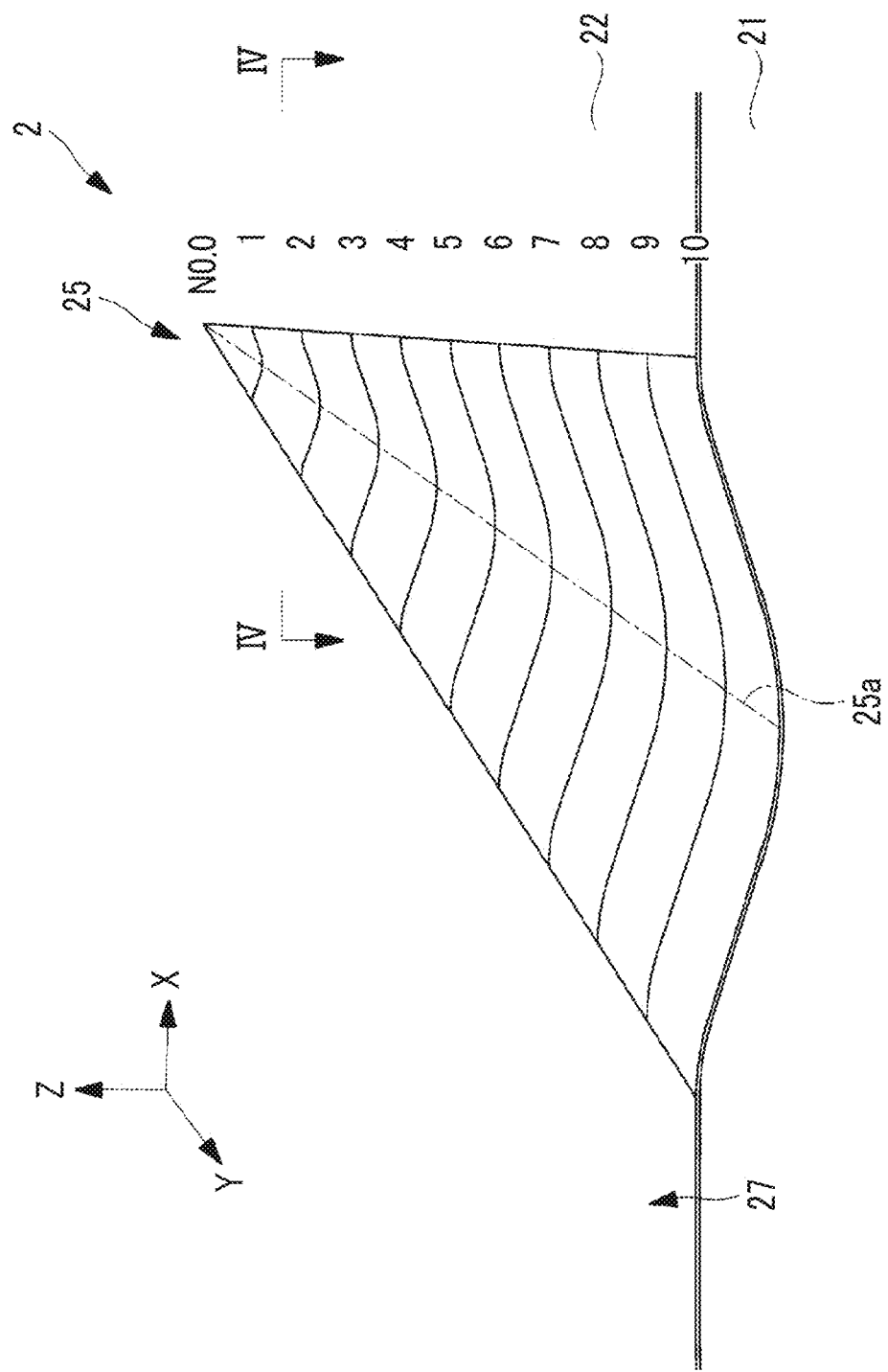
FIG. 3 is an enlarged perspective view of a portion III of FIG. 2.

Each of the recessed portions 25 is formed in the flange corresponding portions 21 such that the length in the X-axis direction is substantially constant. In addition, as shown in FIG. 3, each of the recessed portions 25 is formed in the web corresponding portion 22 such that the length in the X-axis direction is shortened and the depth in the Z-axis direction with respect to the planar portion 27 (refer to a height H in FIG. 4 and details of the height H will be described later) is shallowed from an end portion (one side) of the laminate 2 toward the central portion (the other side) in the Y-axis direction. Incidentally, each of the recessed portions 25 may be formed over the entire regions of the flange corresponding portion 21 and of the web corresponding portion 22 such that the length in the X-axis direction is shortened and the depth is shallowed from the end portion (one side) toward the central portion (the other side) in the Y-axis direction. In FIG. 3, the recessed portion 25 in the web corresponding portion 22 are divided into segments No. 0 to No. 10 at equal intervals in the Y-axis direction. The segments No. 0 to No. 10 are allocated such that the segment No. 0 is the other side of the recessed portion 25 in the web corresponding portion 22 and the segment No. 10 is one side of the recessed portion 25 in the web corresponding portion 22.

Figures 4, 5:
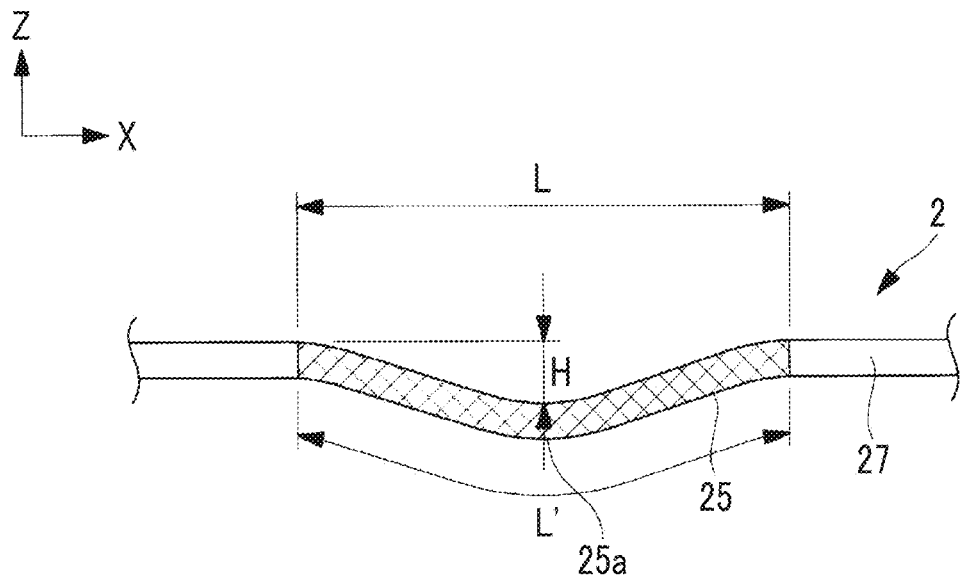
FIG. 4 is a view schematically showing a cross section taken along line IV-IV in FIG. 3.
FIG. 5 is a table showing heights (H), lengths (L) in the longitudinal direction, and elongation amounts at segments No. 0 to No. 10 of a recessed portion of FIG. 3.
Figure 6:
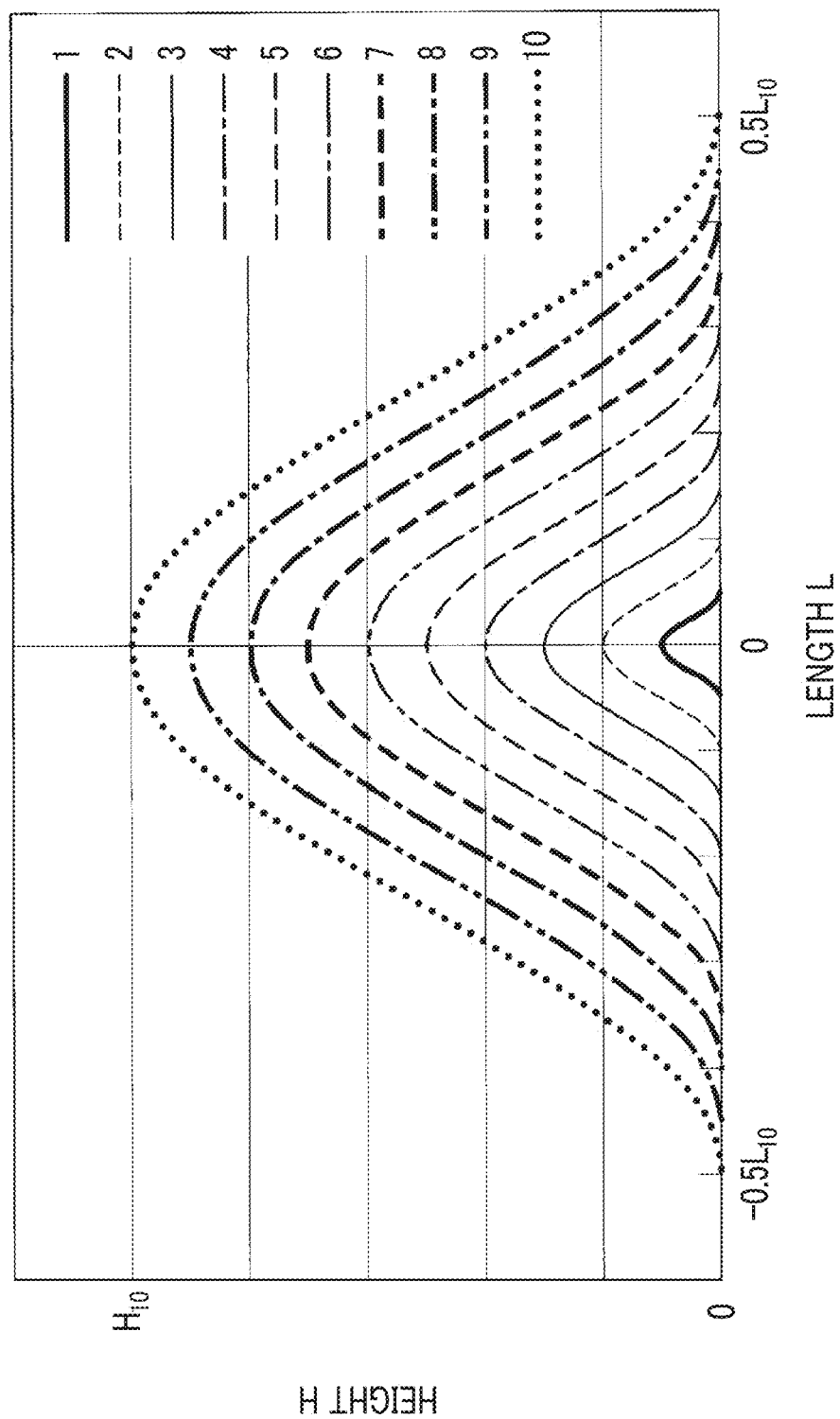
FIG. 6 is a graph showing a relationship between the heights (H) and the lengths (L) in the longitudinal direction at the segments No. 0 to No. 10 of the recessed portion of FIG. 3.
Figure 7:
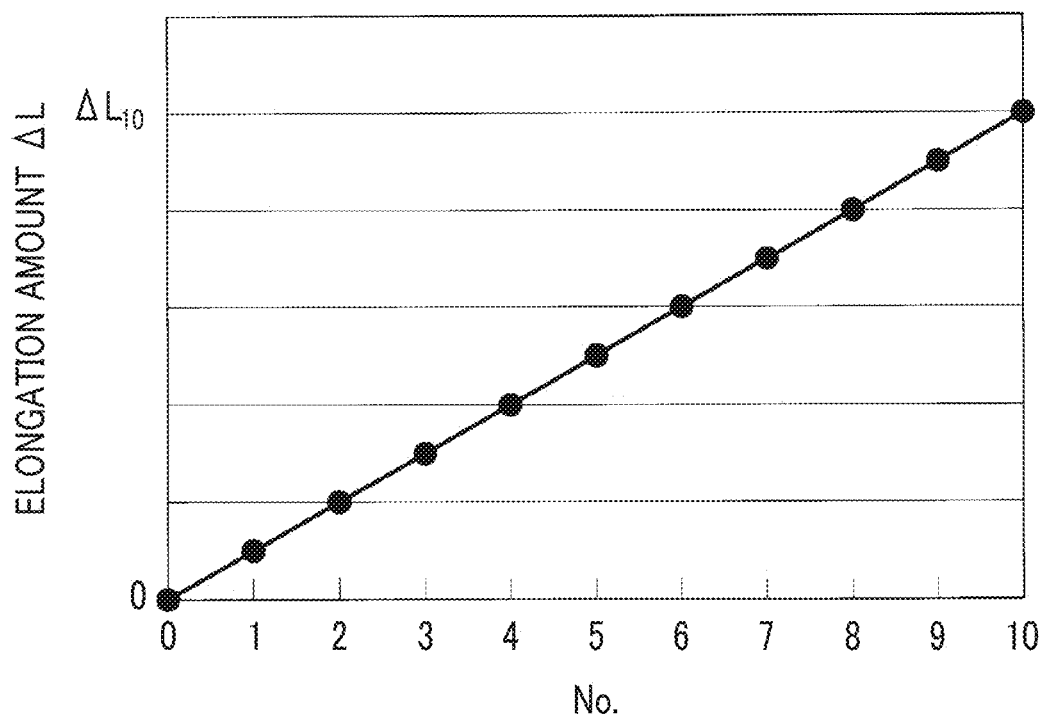
FIG. 7 is a graph showing the elongation amounts at the segments No. 0 to No. 10 of the recessed portion of FIG. 3.

Next, the detailed shape of the recessed portion 25 will be described with reference to FIGS. 4 to 7. FIG. 5 shows the height H, a length L, and an elongation amount ΔL of a cross section in the lateral direction (Y-axis direction) of the recessed portion 25 at the position of each of the segments No. 0 to No. 10 of FIG. 3. In detail, FIG. 5 shows the height H, the length L, and the elongation amount ΔL at the position of each of the segments No. 0 to No. 9 in ratio with respect to those of the segment No. 10. Specifically, each of the height H, the length L, and the elongation amount ΔL at the position of each of the segments No. 0 to No. 9 is 0.1 to 0.9 times that of the segment No. 10. FIG. 6 shows the height H and the length L of FIG. 5 in the form of a graph. Incidentally, in FIG. 6, with a lower end portion 25a (refer to FIG. 3) of the recessed portion 25 set at the center, ratios of lengths from the lower end portion to one end in the X-axis direction are shown as positive values, and ratios of lengths from the lower end portion to the other end in the X-axis direction are shown as negative values. FIG. 7 shows the elongation amount ΔL of FIG. 5 in the form of a graph.

As shown in FIG. 3 and the like, the recessed portion 25 is formed by a curved surface. In addition, a boundary between the recessed portion 25 and the planar portion 27 is formed by a continuous curved surface. Incidentally, the curved surface is a surface in which there is no rapidly changing portion such as a flexed portion or a bent portion. In such a manner, the recessed portion 25 has a shape in which a rapidly changing portion such as a flexed portion or a bent portion is not generated in the laminate 2.

In addition, as described above, the recessed portion 25 is formed in the flange corresponding portion 21 to have a substantially constant length in the X-axis direction at any position in the Y-axis direction. In addition, the recessed portion 25 is formed such that the depth in the Z-axis direction with respect to the planar portion 27 is constant at any position in the Y-axis direction.

In the recessed portion 25 (in detail, a portion provided in the web corresponding portion 22), the height H and the length L in the X-axis direction at the segments No. 0 to No. 10 are set as shown in FIGS. 5 and 6. In addition, the elongation amount ΔL is set as shown in FIGS. 5 and 7. Incidentally, as shown in FIG. 4, the height H of the recessed portion 25 (or also referred to as a "depth") is a distance that is the same as a height from an upper surface of the recessed portion 25 to an upper surface of the planar portion 27 at the lower end portion 25a of the recessed portion 25. In addition, the length L is a length from one end to the other end in the X-axis direction when the recessed portion 25 is viewed from above. In addition, the elongation amount ΔL of the recessed portion 25 is a value indicating an amount by which the laminate 2 is elongated in the X-axis direction when the recessed portion 25 is formed in the forming step, and is a value obtained by subtracting the length L of the recessed portion 25 in the longitudinal direction from a length L' of the laminate 2 in the longitudinal direction when the recessed portion 25 is viewed from the side.

Namely, the elongation amount ΔL is represented by the following equation (1).

$$\Delta L = L' - L \tag{1}$$

The recessed portion 25 (in detail, the portion provided in the web corresponding portion 22) is formed such that cross sections in the Y-axis direction have a similar shape. Namely, as shown in FIGS. 5 and 6, the ratios of the height H, the length L, and the elongation amount ΔL of the recessed portion 25 are the same at any position in the Y-axis direction. In addition, in the present embodiment, the recessed portion 25 is formed such that the cross-sectional shape is a sine curve at any position in the Y-axis direction. In addition, as shown in FIG. 7, the elongation amount ΔL of the recessed portion 25 increases at a constant rate from the segment No. 0 (cap corresponding portion 23 side) toward the segment No. 10 (flange corresponding portion 21 side).

Figure 8:
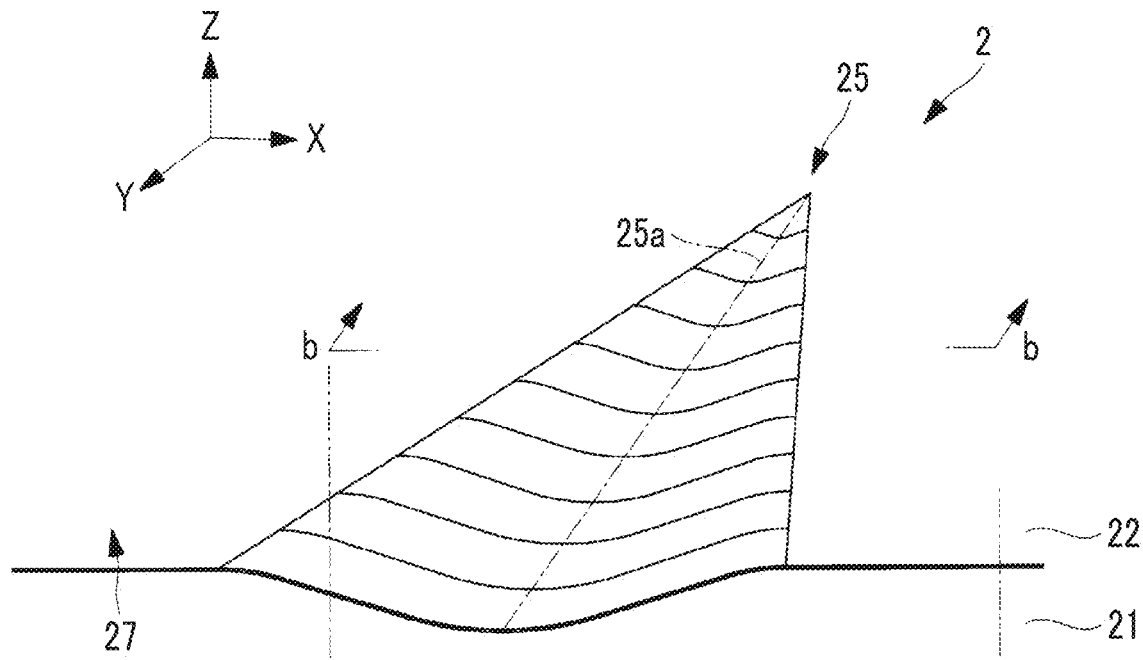
FIGS. 8(a) and 8(b) are views showing the recessed portion and division portions of FIG. 3.
Figure 8:
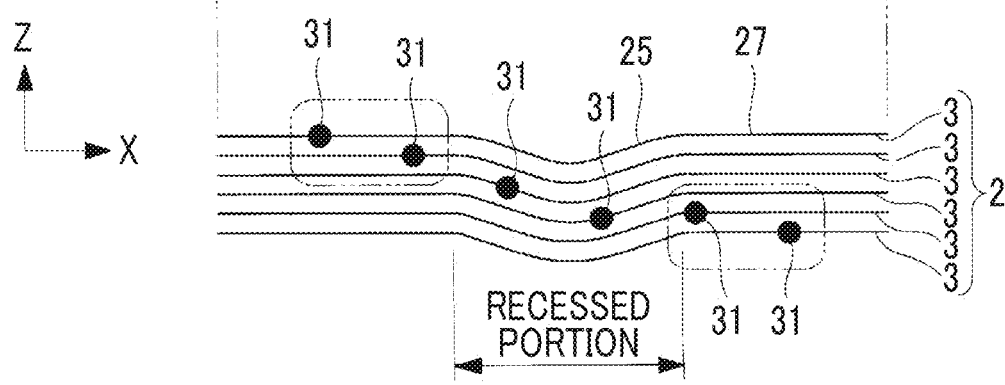

In addition, as shown in FIG. 8, the recessed portion 25 may be provided with division portions 31 that divide the fibers of the fiber sheets 3 in the dividing step. FIG. 8(*b*) shows only a plurality of the fiber sheets 3 of which the fiber directions are aligned at a predetermined angle of 0 degrees in the laminate 2. In addition, in the same drawing, the fiber directions coincide with a left-right direction of the drawing sheet (X-axis direction).

In the present embodiment, the laminate 2 includes six fiber sheets 3 of which the fiber directions are aligned at a predetermined angle of 0 degrees. Incidentally, the number of the fiber sheets 3 is one example and can be arbitrarily changed.

Each one of the fiber sheets 3 is provided with one division portion 31. Namely, the laminate 2 is provided with a total of six division portions 31. In addition, in the laminate 2, the division portions 31 of two fiber sheets 3 adjacent to each other in a lamination direction are disposed to be adjacent to each other in the fiber direction. In addition, the division portions 31 of the fiber sheets 3 are disposed at equal intervals in the fiber direction. In addition, the division portions 31 are disposed not to overlap each other in the lamination direction (Z direction).

In the example of FIG. 8(*b*), among a plurality of division portions 31, two division portions 31 are provided in the recessed portion 25, and the remaining four division portions 31 are provided in the planar portion 27. Incidentally, the division portions 31 may be provided only in the recessed portion 25 without providing the division portions 31 in the planar portion 27.

Next, the projecting portion 26 will be described. In the forming step, as shown in FIG. 2, one projecting portion 26 is formed in a predetermined portion of the laminate 2 having a plate shape. The predetermined portion is a portion that serves as the first bent portion 17 after the longitudinal deformation step is performed (vicinity of one third from one end of the laminate 2 in the X-axis direction), and is a central portion in the Y-axis direction. The projecting portion 26 protrudes upward. The projecting portion 26 is formed over substantially the entire regions of two web corresponding portions 22 and of the cap corresponding portion 23 in the Y-axis direction.

In addition, the projecting portion 26 does not reach the end portion of the laminate 2 in the Y-axis direction, and the flange corresponding portion 21 that is a part of the planar portion 27 exists between the projecting portion 26 and the end portion in the Y-axis direction. In such a manner, the projecting portion 26 is formed at a position corresponding to the cap portion 13 and to the web portion 12 after the longitudinal deformation step is performed.

The projecting portion 26 is formed in the cap corresponding portion 23 such that the length in the X-axis direction is substantially constant. In addition, the projecting portion 26 is formed in the web corresponding portions 22 such that the length in the X-axis direction is shortened and the height in the Z-axis direction with respect to the planar portion 27 decreases from the central portion (the other side) toward both the end portions (one side) in the Y-axis direction. Incidentally, the projecting portion 26 may be formed over the entire regions of the cap corresponding portion 23 and of the web corresponding portions 22 such that the length in the X-axis direction is shortened and the height decreases from the end portions (one side) toward the central portion (the other side) in the Y-axis direction.

In addition, similarly to each of the recessed portions 25, the projecting portion 26 is formed by a curved surface. In addition, a boundary between the projecting portion 26 and the planar portion 27 is formed by a continuous curved surface. In such a manner, the projecting portion 26 has a shape in which a rapidly changing portion such as a flexed portion or a bent portion is not generated in the laminate 2. In addition, similarly to each of the recessed portions 25, the projecting portion 26 (in detail, a portion provided in the web corresponding portion 22) is formed such that cross sections in the Y-axis direction have a similar shape. In addition, the projecting portion 26 is formed such that the cross-sectional shape is a sine curve at any position in the Y-axis direction. In addition, the elongation amount of the projecting portion 26 increases at a constant rate from the flange corresponding portion 21 side toward the cap corresponding portion 23 side.

Figure 9:
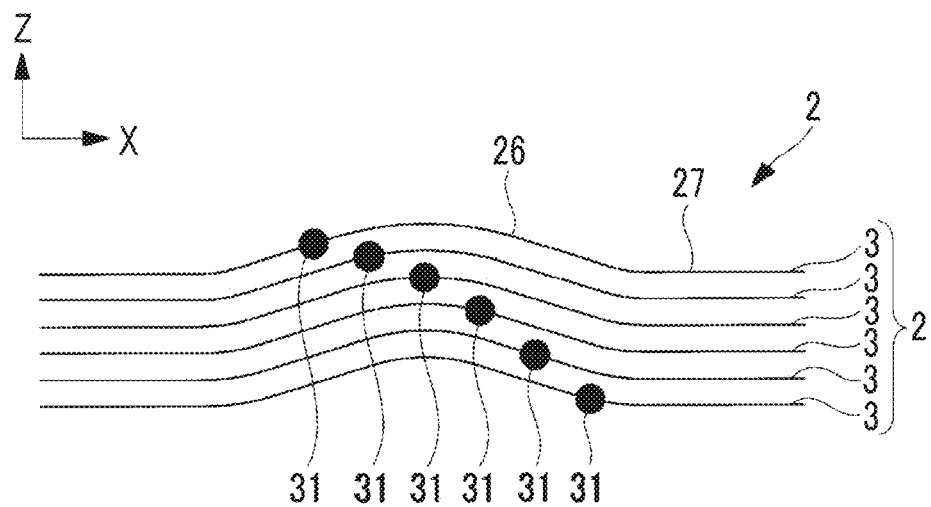
FIG. 9 is a cross-sectional view taken along line IX-IX in FIG. 2.

In addition, as shown in FIG. 9, the projecting portion 26 is provided with the division portions 31 that divide the fibers of the fiber sheets 3 in the dividing step. Similarly to each of the recessed portions 25, in the projecting portion 26, one division portion 31 is provided in each of the fiber sheets 3. In addition, the division portions 31 of the fiber sheets 3 are disposed at equal intervals in the fiber direction. In addition, the division portions 31 are disposed not to overlap each other in the lamination direction.

When the recessed portions 25 and the projecting portion 26 are formed, next, the lateral deformation step and the longitudinal deformation step are performed.

In the lateral deformation step, the laminate 2 in which the recessed portions 25 and the projecting portion 26 are formed is deformed in the lateral direction to form the flange portions 11, the web portions 12, and the cap portion 13. In addition, in the longitudinal deformation step, the laminate 2 in which the recessed portions 25 and the projecting portion 26 are formed is deformed in the longitudinal direction to form the first bent portion 17 and the second bent portion 18. Namely, in the longitudinal deformation step, the laminate 2 is deformed such that the recessed portions 25 and the projecting portion 26 are deformed. In detail, in the longitudinal deformation step, the laminate 2 is deformed such that a region adjacent to the recessed portion 25 in the longitudinal direction (X-axis direction) moves in a direction (namely, upward in the present embodiment) opposite to an expanding direction of the curved surface of the recessed portion 25 (downward in the present embodiment). In addition, the laminate 2 is deformed such that a region adjacent to the projecting portion 26 in the longitudinal direction (X-axis direction) moves in a direction (namely, downward in the present embodiment) opposite to an expanding direction of a curved surface of the projecting portion 26 (upward in the present embodiment).

Incidentally, any means may be adopted as means for performing the lateral deformation step and the longitudinal deformation step. For example, the lateral deformation step and the longitudinal deformation step may be formed by pressing the laminate 2 against mandrels corresponding to the shape of the composite structure 1 after completion. In this case, the lateral deformation step and the longitudinal deformation step are performed at the same time. Incidentally, when the lateral deformation step and the longitudinal deformation step are performed using mandrels, the mandrel for performing deformation in the lateral direction and the mandrel for performing deformation in the longitudinal direction may be used at different timings. Namely, the lateral deformation step and the longitudinal deformation step may not be performed at the same time. In addition, a roll molding device may perform the longitudinal deformation step after the lateral deformation step is performed.

In the present embodiment, the composite structure 1 is manufactured in such a manner.

According to the present embodiment, the following effects are exhibited.

In the case of performing deformation in the longitudinal direction (X-axis direction) and deformation in the lateral direction (Y-axis direction) on the laminate 2, when the laminate 2 is deformed in the longitudinal direction (namely, when a cross section in the lateral direction is deformed), a portion having a large radius of curvature and a portion having a small radius of curvature are generated depending on the position of a curved or bent portion in the lateral direction. A tensile force acts on the portion having a large radius of curvature in the longitudinal direction, and a compressive force acts on the portion having a small radius of curvature in the longitudinal direction.

In the present embodiment, before the laminate 2 is deformed in the lateral direction and in the longitudinal direction, the recessed portions 25 and the projecting portion 26 are formed in predetermined portions of the laminate 2. When the recessed portions 25 and the projecting portion 26 are formed, the laminate 2 is deformed and elongated by the amount of detour of the recessed portion 25 and of the projecting portion 26. Hence, in regions including the portions in which the recessed portion 25 and the projecting portion 26 are formed, the length of the laminate 2 in the longitudinal direction is lengthened by the amount of detour of the recessed portion 25 and of the projecting portion 26. Therefore, when the laminate 2 is deformed in the longitudinal direction after the recessed portions 25 and the projecting portion 26 are formed, the tensile force generated in the portion having a large radius of curvature is suppressed by an amount by which the length of the laminate 2 in the longitudinal direction is lengthened. Since the tensile force generated in the portion having a large radius of curvature is suppressed, the compressive force generated in the portion having a small radius of curvature is also suppressed. Therefore, the generation of wrinkles can be suppressed. Hence, the strength of the composite structure can be improved.

For example, in a case where a rapidly changing portion such as a flexed portion or a bent portion exists in the laminate 2, when deformation in the lateral direction or deformation in the longitudinal direction is performed, wrinkles may be generated due to the portion. In the present embodiment, the recessed portions 25 and the projecting portion 26 each of which is formed by a curved surface are formed in the forming step. Accordingly, a curved surface portion of each of the recessed portion 25 and the projecting portion 26 has a smooth shape in which there is no rapidly changing portion. Therefore, the generation of wrinkles can be further suppressed when deformation in the lateral direction or deformation in the longitudinal direction is performed on the laminate 2. Hence, the strength of the composite structure can be further improved.

In addition, since the recessed portion 25 and the projecting portion 26 each of which is formed by a curved surface are formed in the forming step, the recessed portion 25 and the projecting portion 26 can also be easily formed in the forming step.

In addition, the recessed portions 25 and the projecting portion 26 are formed in the laminate 2 molded in the lamination step. For this reason, in the lamination step, the laminate 2 having a flat plate shape may be formed, so that the laminate 2 can be molded by laminating the fiber sheets 3 on a flat surface. Therefore, the step of molding the laminate 2 can be more simplified as compared to the case of laminating the fiber sheets 3 on a mold having a non-planar surface.

In the present embodiment, the recessed portion 25 and the projecting portion 26 are formed to include portions to be deformed in the longitudinal deformation step. Accordingly, when the laminate 2 is deformed in the longitudinal direction, the tensile force generated in the portion having a large radius of curvature can be more favorably suppressed. Therefore, the compressive force acting on the portion having a small radius of curvature can be suppressed, and the generation of wrinkles can be more favorably suppressed. Hence, the strength of the composite structure can be more favorably improved.

In the present embodiment, the boundaries between the recessed portion 25 and the planar portion 27 and between the projecting portion 26 and the planar portion 27 are continuous curved surfaces. Accordingly, the boundaries between the recessed portion 25 and the planar portion 27 and between the projecting portion 26 and the planar portion 27 can also have a smooth shape in which there is no rapidly changing portion. Therefore, the generation of wrinkles can be further suppressed when deformation in the lateral direction or deformation in the longitudinal direction is performed on the laminate 2. Hence, the strength of the composite structure can be more favorably improved.

In the present embodiment, the length of each of the recessed portion 25 and the projecting portion 26 in the longitudinal direction decreases from the one side to the other side in the lateral direction. Accordingly, as compared to the recessed portion 25 and the projecting portion 26 each having a constant length in the longitudinal direction regardless of the position in the lateral direction, a region to be deformed can be more reduced when the recessed portion 25 and the projecting portion 26 are formed in the forming step. Accordingly, the recessed portion 25 and the projecting portion 26 can be easily formed in the forming step.

In the present embodiment, the dividing step of dividing the fibers of the fiber sheets 3 in predetermined portions is provided before the forming step. Accordingly, in the forming step, the predetermined portions of the laminate 2 are easily elongated in the longitudinal direction. Therefore, in the forming step, the recessed portion 25 and the projecting portion 26 can be favorably formed.

In the present embodiment, the division portions 31 are disposed apart from each other in the longitudinal direction not to overlap each other in the lamination direction. Accordingly, it is possible to avoid a situation where the plurality of division portions 31 are disposed on the same cross section in the lamination direction of the laminate 2. Therefore, a decrease in the strength of the laminate 2 can be suppressed.

In the present embodiment, each of the recessed portion 25 and the projecting portion 26 (in detail, the portions provided in web corresponding portion 22) is formed such that cross sections in the Y-axis direction have a similar shape. In addition, the elongation amount increases at a constant rate from the central portion toward the end portion in the Y-axis direction. Accordingly, it is easy to predict an elongation amount of each of the recessed portion 25 and the projecting portion 26 at each location on the laminate 2 in the Y-axis direction. Therefore, the recessed portion 25 and the projecting portion 26 can be favorably formed.

Second Embodiment

Next, a second embodiment according to the present disclosure will be described with reference to FIGS. 10 to 14. Incidentally, the present embodiment is different from the first embodiment in that a recessed portion and a projecting portion in the web corresponding portion 22 have different shapes. Since other points are the same as those of the first embodiment, the same configurations are denoted by the same reference signs, and a detailed description thereof will be omitted.

Figure 10:
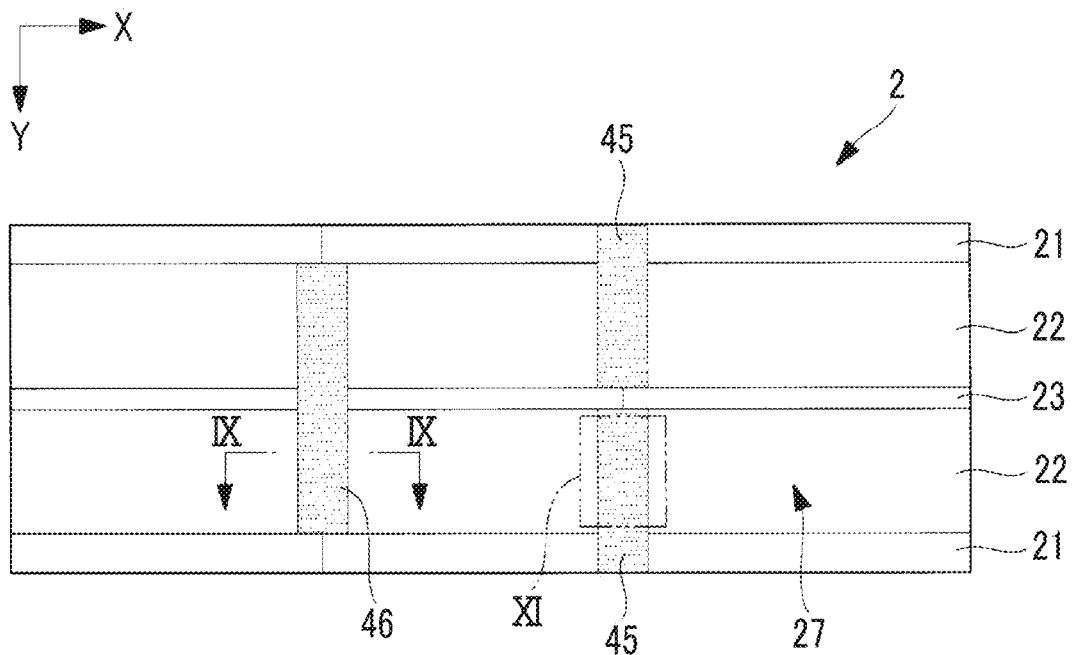
FIG. 10 is a schematic plan view showing a state of a composite structure according to a second embodiment before the composite structure is deformed in the longitudinal direction and in the lateral direction.

As shown in FIG. 10, the length of each of recessed portions 45 according to the present embodiment in the X-axis direction is constant in the flange corresponding portion 21 and in the web corresponding portion 22 regardless of the position in the Y-axis direction. In addition, the length of a projecting portion 46 in the X-axis direction is constant in the web corresponding portion 22 and in the cap corresponding portion 23 regardless of the position in the Y-axis direction. Namely, each of the recessed portions 45 and the projecting portion 46 are formed in a rectangular shape in a plan view.

Figure 11:
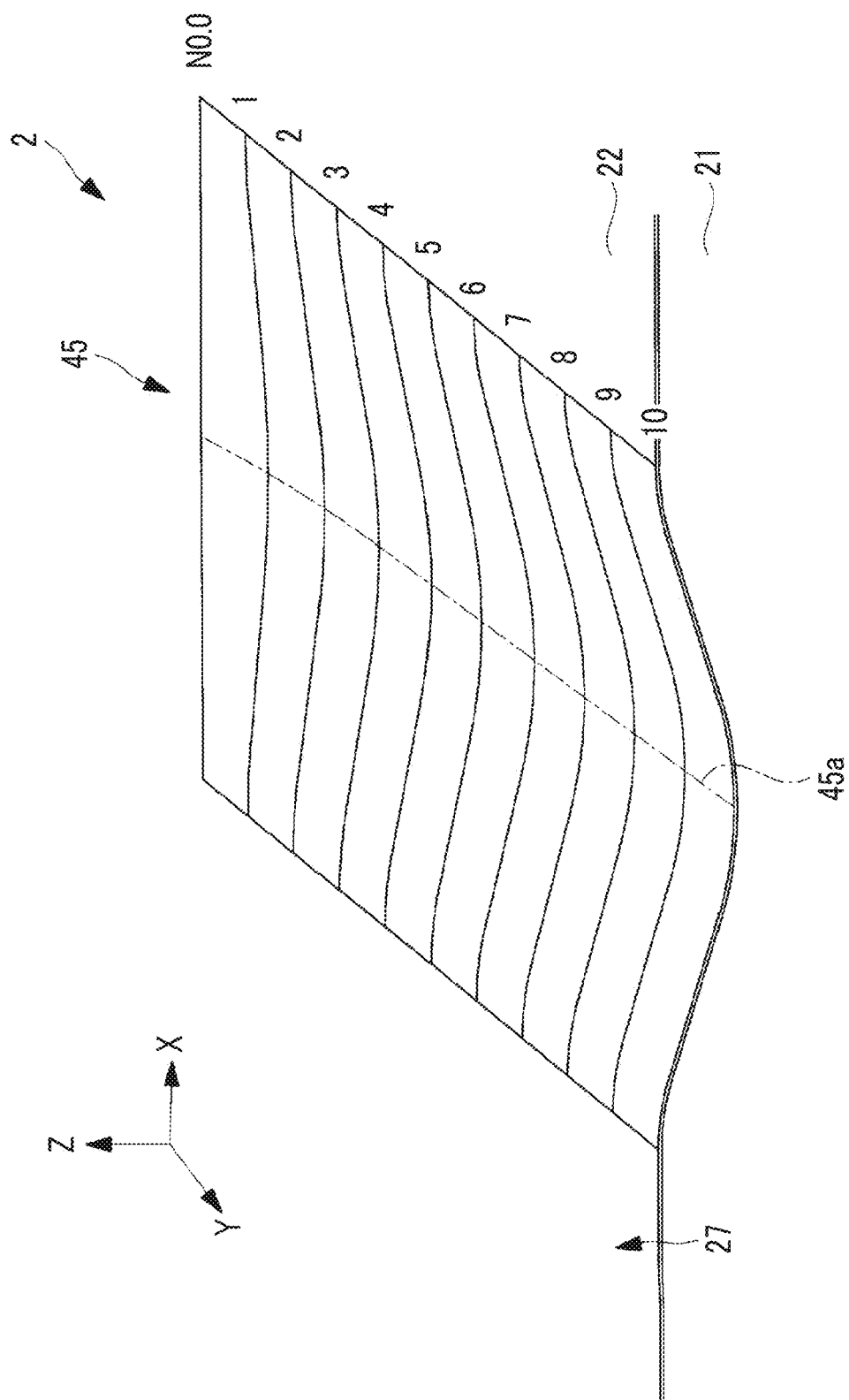
FIG. 11 is an enlarged perspective view of a portion XI of FIG. 10.

As shown in FIG. 11, each of the recessed portions 45 is formed in the web corresponding portion 22 such that the depth is shallowed from the end portion (one side) toward the central portion (the other side) in the Y-axis direction. Incidentally, each of the recessed portions 45 may be formed over the entire regions of the flange corresponding portion 21 and of the web corresponding portion 22 such that the depth is shallowed from the end portion (one side) toward the central portion (the other side) in the Y-axis direction. In FIG. 11, the recessed portion 45 in the web corresponding portion 22 is divided into segments No. 0 to No. 10 at equal intervals in the Y-axis direction. The segments No. 0 to No. 10 are allocated such that the segment No. 0 is the other side of the recessed portion 45 in the web corresponding portion 22 and the segment No. 10 is one side of the recessed portion 45 in the web corresponding portion 22.

Figure 14:
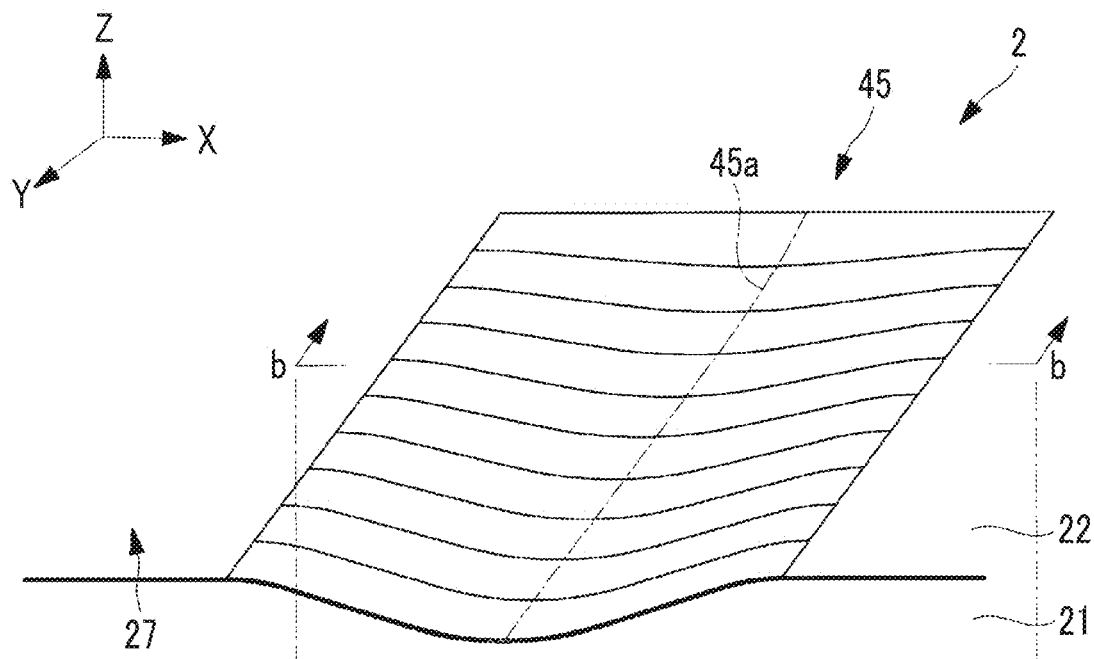
FIGS. 14(a) and 14(b) are views showing the recessed portion and division portions of FIG. 11.
Figure 14:
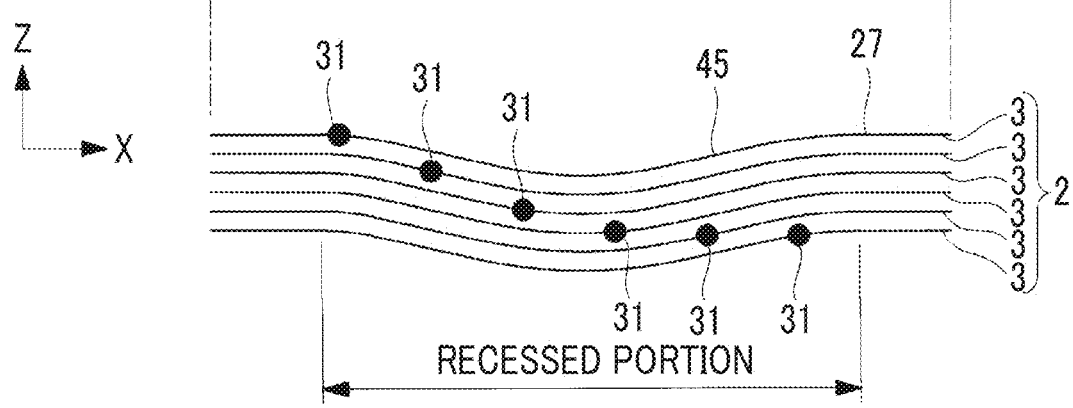

As shown in FIG. 11 and the like, each of the recessed portions 45 is formed by a curved surface. In addition, a boundary between the recessed portion 45 and the planar portion 27 is formed by a continuous curved surface. In FIGS. 11 and 14, an alternate long and short dash line 45a indicates a lower end portion of the recessed portion 45.

Figure 13:
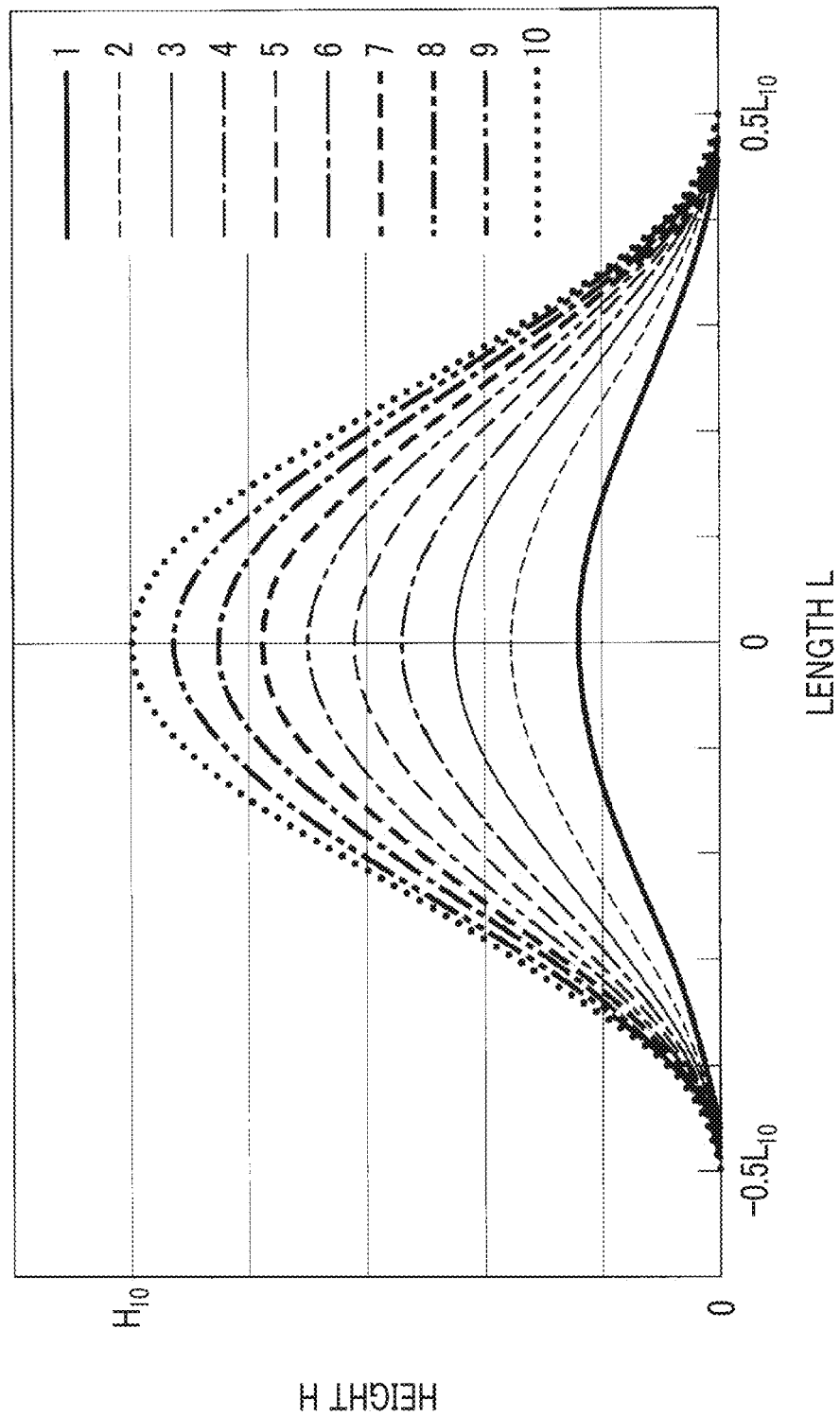
FIG. 13 is a graph showing a relationship between the heights (H) and the lengths (L) in the longitudinal direction at the segments No. 0 to No. 10 of the recessed portion of FIG. 11.

In each of the recessed portions 45 (in detail, portions provided in the web corresponding portion 22), the height H and the length L in the X-axis direction at the segments No. 0 to No. 10 are set as shown in FIGS. 12 and 13. In addition, the elongation amount ΔL is set as shown in FIG. 12. FIGS. 12 and 13 show the height H and the elongation amount ΔL at the position of each of the segments No. 0 to No. 9 in ratio with respect to those of the segment No. 10. Specifically, for example, the height H of the segment No. 1 is 0.241 times the height H of the segment No. 10. Incidentally, the elongation amounts ΔL are at the same ratios as those of the segments No. 0 to No. 10 of the recessed portion 25 in the first embodiment. Namely, as shown in FIG. 7, similarly to the recessed portion 25, the elongation amount ΔL of the recessed portion 45 increases at a constant rate from the segment No. 0 (cap corresponding portion 23 side) toward the segment No. 10 (flange corresponding portion 21 side).

In addition, the recessed portion 45 is formed such that the cross-sectional shape is a sine curve at any position in the Y-axis direction.

In addition, as shown in FIG. 14, the recessed portion 45 is provided with the division portions 31 that divide the fibers of the fiber sheets 3. All of a plurality (six) of the division portions 31 are provided in the recessed portion 45. Since the length of the recessed portion 45 in the X-axis direction is constant in the Y-axis direction, all of the plurality (six) of division portions 31 are provided in the recessed portion 45 at any position in the Y-axis direction.

The projecting portion 46 is formed in the web corresponding portion 22 such that the height decreases from the central portion (the other side) toward both the end portions (one side) in the Y-axis direction. Incidentally, the projecting portion 46 may be formed over the entire regions of the cap corresponding portion 23 and of the web corresponding portion 22 such that the height decreases from the central portion (the other side) toward the end portion (one side) in the Y-axis direction. Since the cross-sectional shape of the projecting portion 46 is substantially the same as the shape of the projecting portion 26 of the first embodiment (refer to FIG. 9), a detailed description thereof will be omitted.

According to the present embodiment, the following effects are exhibited.

In the present embodiment, the length of each of the recessed portion 45 and the projecting portion 46 in the longitudinal direction is constant regardless of the position in the lateral direction. Accordingly, even when the division portions 31 are disposed apart from each other in the longitudinal direction, the numbers of the division portions 31 included in the recessed portion 45 and in the projecting portion 46 can be set to the same number at any position in the lateral direction. Therefore, the number of the division portions 31 included in the recessed portion 45 and in the projecting portion 46 can be set to be larger as compared to that of the recessed portion and the projecting portion of which the lengths in the longitudinal direction decrease from the one side toward the other side in the lateral direction (for example, the recessed portion 25 and the like shown in FIG. 8). Hence, the laminate 2 can be favorably elongated in the longitudinal direction in the forming step, so that the recessed portion 45 and the projecting portion 46 can be favorably formed.

Third Embodiment

Next, a third embodiment according to the present disclosure will be described with reference to FIGS. 15 to 17.

In the present embodiment, the shape of a composite structure is different from that of the first embodiment and the second embodiment. Since other points are the same as those of the first embodiment, the same configurations are denoted by the same reference signs, and a detailed description thereof will be omitted.

Figure 15:
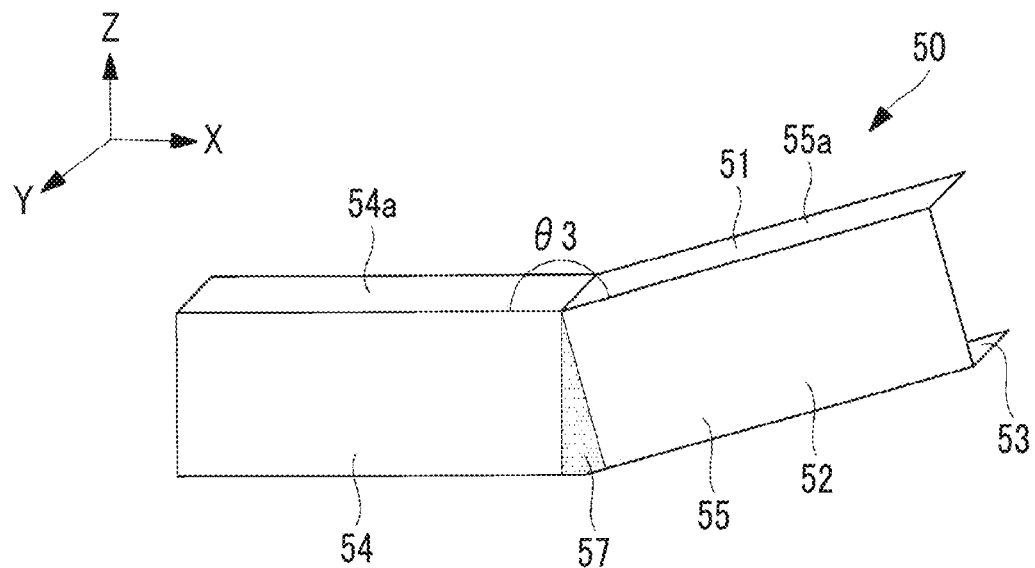
FIG. 15 is a perspective view showing a composite structure according to a third embodiment.
Figure 16:
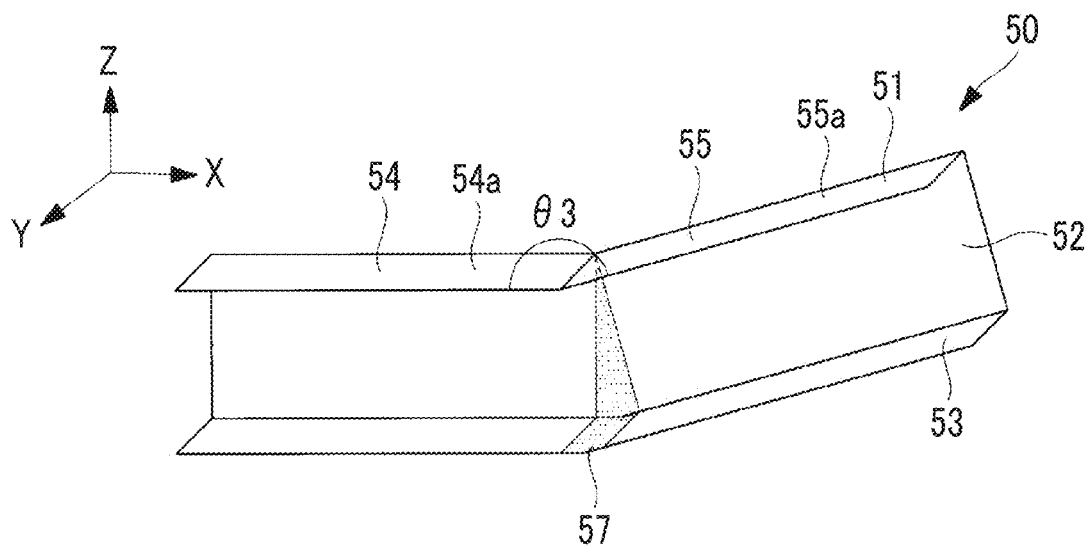
FIG. 16 is a perspective view showing the composite structure according to the third embodiment.

As shown in FIGS. 15 and 16, a composite structure 50 of the present embodiment integrally includes first surface portions 51 disposed at both ends in the Z-axis direction to extend substantially parallel to a plane formed by the X-axis direction and the Y-axis direction, second surface portions 52 flexed from one ends of the first surface portions 51 in the Y-axis direction at a substantially right angle to extend downward, and third surface portions 53 flexed from lower ends of the second surface portions 52 at a substantially right angle to extend substantially parallel to the same direction as that of the first surface portions 51.

In addition, the composite structure 50 integrally includes one end portion 54 that is one end side of the composite structure 50 in the longitudinal direction, and the other end portion 55 that is the other end side in the longitudinal direction. The one end portion 54 and the other end portion 55 have substantially the same length in the longitudinal direction. The one end portion 54 and the other end portion 55 are connected to each other in a bent shape to have a predetermined angle in a cross section in the lateral direction. Hereinafter, a connecting portion between the one end portion 54 and the other end portion 55 is referred to as a bent portion 57. At the bent portion 57, an angle θ3 formed by a plate surface on one side of the first surface portion 51 in the one end portion 54 (upper surface 54a in the present embodiment) and a plate surface on the one side of the first surface portion 51 in the other end portion 55 (upper surface 55a in the present embodiment) is an obtuse angle.

The composite structure 50 having such a shape is manufactured by the following method. Since a lamination step, a division step, a longitudinal deformation step, and a lateral deformation step are the same as those of the first embodiment and of the second embodiment, a detailed description thereof will be omitted.

Figure 17:
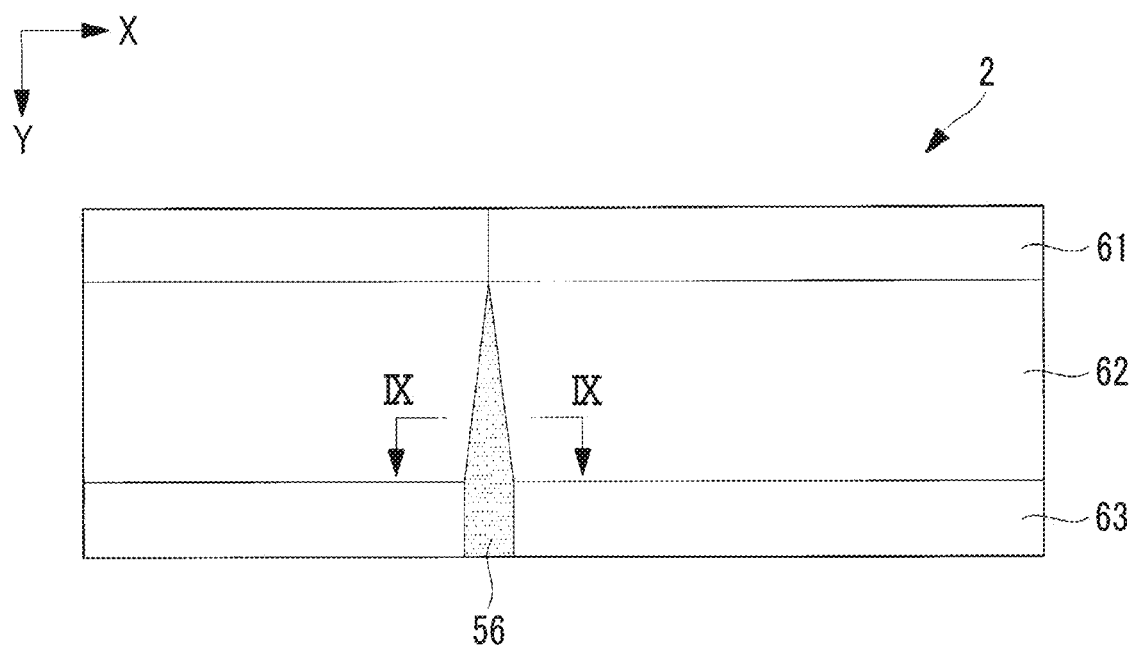
FIG. 17 is a schematic plan view showing a state of the composite structure of FIGS. 15 and 16 before the composite structure is deformed in the longitudinal direction and in the lateral direction.

In the forming step of the present embodiment, as shown in FIG. 17, only one projecting portion 56 is formed in a predetermined portion of the laminate 2 having a plate shape. The predetermined portion is a portion that serves as the bent portion 57 after the longitudinal deformation step is performed (vicinity of a center of the laminate 2 in the X-axis direction), and is one end side in the Y-axis direction. The projecting portion 56 protrudes upward (in a front direction of the drawing sheet of FIG. 17). The projecting portion 56 is formed over substantially the entire regions of a second corresponding portion 62 (serving as the second surface portions 52 after the longitudinal deformation step and the lateral deformation step are formed) and of a third corresponding portion 63 (serving as the third surface portions 53 after the longitudinal deformation step and the lateral deformation step are performed) in the Y-axis direction. Namely, the projecting portion 56 is not formed in a first corresponding portion 61 (serving as the first surface portions 51 after the longitudinal deformation step and the lateral deformation step are performed).

The projecting portion 56 is formed in the third corresponding portion 63 such that the length in the X-axis direction is substantially constant. In addition, the projecting portion 56 is formed over substantially the entire region of the second corresponding portion 62 in the Y-axis direction such that the length in the X-axis direction is lengthened and the height increases from the other side (upper side of the drawing sheet of FIG. 17 in the present embodiment) toward the one side (lower side of the drawing sheet of FIG. 17 in the present embodiment) in the Y-axis direction.

In addition, the projecting portion 56 is formed in the third corresponding portion 63 to have a constant length in the X-axis direction at any position in the Y-axis direction. In addition, the projecting portion 56 is formed to have a constant height at any position in the Y-axis direction.

Incidentally, the projecting portion 56 may be formed over the entire regions of the third corresponding portion 63 and of the second corresponding portion 62 such that the length in the X-axis direction is lengthened and the height increases from the other side (upper side of the drawing sheet of FIG. 17 in the present embodiment) toward the one side (lower side of the drawing sheet of FIG. 17 in the present embodiment) in the Y-axis direction. Since the cross-sectional shape of the projecting portion 56 is substantially the same as the shape of the projecting portion 26 of the first embodiment (refer to FIG. 9), a detailed description thereof will be omitted.

Even with the composite structure 50, the same effects as those of the first embodiment can be obtained by applying the manufacturing method of the present disclosure.

Incidentally, instead of one projecting portion 56, one recessed portion may be formed in a predetermined portion of the laminate 2 having a plate shape. Whether a projecting portion or a recessed portion is performed in the laminate 2 is determined by a bending direction of the laminate. Namely, when the laminate 2 shown in FIG. 17 is bent to a back side of the drawing sheet, a projecting portion is formed, and when the laminate 2 is bent to a front side of the drawing sheet, a recessed portion is formed.

Incidentally, the present disclosure is not limited to the embodiments, and can be appropriately modified without departing from the concept of the present disclosure.

For example, in each of the embodiments, an example has been described in which a cross section of the recessed portion or the projecting portion in the Y-axis direction has a sine curve shape, but the present disclosure is not limited thereto. The recessed portion and the projecting portion may have a smooth shape that does not include a flexed portion or the like.

In addition, in each of the embodiments, an example has been described in which in the forming step, the recessed portion or the projecting portion is formed such that the elongation amount $\Delta L$ is a target elongation amount $\Delta L$ (namely, elongation amount $\Delta L$ when the composite structure 1 is completed), but the present disclosure is not limited thereto. For example, in the forming step, the recessed portion or the projecting portion may be formed such that the elongation amount $\Delta L$ is smaller than the target elongation amount $\Delta L$ (namely, elongation amount $\Delta L$ when the composite structure 1 is completed).

In addition, the composite structure to which the present disclosure is applicable is not limited to a composite structure having the shape described in each of the embodiments. For example, in the first embodiment and the second embodiment, an example has been described in which the one end portion 14, the other end portion 15, and the central portion 16 have substantially the same length in the longitudinal direction (refer to FIG. 1); however, the one end portion 14, the other end portion 15, and the central portion 16 may have different lengths in the longitudinal direction. In addition, in the first embodiment and the second embodiment, an example has been described in which the angle θ1 at the first bent portion and the angle θ2 at the second bent portion 18 are substantially the same; however, the angle θ1 at the first bent portion 17 and the angle θ2 at the second bent portion 18 may be different from each other. In addition, for example, in the first embodiment and the second embodiment, an example has been described in which two bent portions (the first bent portion 17 and the second bent portion 18) are provided; however, the number of the bent portions is not limited to 2. The number of the bent portions may be a singular number or a plural number of 3 or more.

Examples of the shape in which the number of the bent portions is a singular number include a shape formed only by the one end portion 14, the central portion 16, and the first bent portion 17 in FIG. 1, and a shape formed only by the central portion 16, the other end portion 15, and the second bent portion 18. In addition, in the third embodiment, an example has been described in which the one end portion 54 and the other end portion 55 have substantially the same length in the longitudinal direction (refer to FIGS. 15 and 16); however, the one end portion 54 and the other end portion 55 may have different lengths in the longitudinal direction.

For example, the method for manufacturing the composite structure and the laminate described in each embodiment are understood as follows.

According to one aspect of the present disclosure, there is provided a method for manufacturing a composite structure (1), the method including: a lamination step of molding a laminate (2) having a plate shape by laminating a plurality of fiber sheets (3); a forming step of forming a recessed portion (25) or a projecting portion (26) formed by a curved surface, in a predetermined portion of the laminate; a lateral deformation step of providing a predetermined shape to a cross section in a longitudinal direction by deforming the laminate in a lateral direction after the forming step; and a longitudinal deformation step of providing a predetermined shape to a cross section in the lateral direction by deforming the laminate in the longitudinal direction to deform the recessed portion or the projecting portion formed in the forming step, after the forming step.

In the case of performing deformation in the longitudinal direction and deformation in the lateral direction on the laminate, when the laminate is deformed in the longitudinal direction (namely, when a cross section in the lateral direction is deformed), a portion having a large radius of curvature and a portion having a small radius of curvature are generated depending on the position of a curved or bent portion in the lateral direction. A tensile force acts on the portion having a large radius of curvature in the longitudinal direction, and a compressive force acts on the portion having a small radius of curvature in the longitudinal direction.

In the above configuration, the recessed portion or the projecting portion is formed in the predetermined portion of the laminate before the laminate is deformed in the lateral direction and in the longitudinal direction. When the recessed portion or the projecting portion is formed, the laminate is deformed and elongated by the amount of detour of the recessed portion or the projecting portion. Hence, in a region including the portion in which the recessed portion or the projecting portion is formed, the length of the laminate in the longitudinal direction is lengthened by the amount of detour of the recessed portion or the projecting portion. Therefore, when the laminate is deformed in the longitudinal direction after the recessed portion or the projecting portion is formed, the tensile force generated in the portion having a large radius of curvature is suppressed by an amount by which the length of the laminate in the longitudinal direction is lengthened. Since the tensile force generated in the portion having a large radius of curvature is suppressed, the compressive force generated in the portion having a small radius of curvature is also suppressed. Therefore, the generation of wrinkles can be suppressed. Hence, the strength of the composite structure can be improved.

For example, in a case where a rapidly changing portion such as a flexed portion or a bent portion exists in the laminate, when deformation in the lateral direction or deformation in the longitudinal direction is performed, wrinkles may be generated due to the portion. In the above configuration, the recessed portion or the projecting portion formed by a curved surface is formed in the forming step. Accordingly, a curved surface portion of the recessed portion or of the projecting portion has a smooth shape in which there is no rapidly changing portion. Therefore, the generation of wrinkles can be further suppressed when deformation in the lateral direction or deformation in the longitudinal direction is performed on the laminate. Hence, the strength of the composite structure can be further improved.

In addition, the recessed portion or the projecting portion is formed in the laminate molded in the lamination step. For this reason, in the lamination step, the laminate having a flat plate shape may be formed, so that the laminate can be molded by laminating the fiber sheets on a flat surface. Therefore, the step of molding the laminate can be more simplified as compared to the case of laminating the fiber sheets on a mold having a non-planar surface.

Incidentally, the cross section in the longitudinal direction means a cross section when the composite structure 1 is cut by a plane orthogonal to the longitudinal direction. In addition, similarly, the cross section in the lateral direction means a cross section when the composite structure is cut by a plane orthogonal to the lateral direction.

In addition, the lateral deformation step and the longitudinal deformation step may be performed at the same time.

In addition, in the above configuration, the laminate is deformed in the longitudinal direction such that the recessed portion or the projecting portion formed in the forming step is deformed. Accordingly, when the laminate is deformed in the longitudinal direction, the tensile force generated in the portion having a large radius of curvature can be more favorably suppressed. Therefore, the compressive force acting on the portion having a small radius of curvature can be suppressed, and the generation of wrinkles can be more favorably suppressed. Hence, the strength of the composite structure can be more favorably improved.

In addition, in the method for manufacturing a composite structure according to one aspect of the present disclosure, the recessed portion or the projecting portion has a sine curve shape.

In the above configuration, since the recessed portion or the projecting portion has a smoother shape, when deformation in the lateral direction or deformation in the longitudinal direction is performed on the laminate, the generation of wrinkles can be more favorably suppressed. Hence, the strength of the composite structure can be more favorably improved.

In addition, in the method for manufacturing a composite structure according to one aspect of the present disclosure, the laminate includes a planar portion (27) having a flat plate shape, and in the forming step, the recessed portion or the projecting portion is formed such that a boundary between the recessed portion or the projecting portion and the planar portion is a continuous curved surface.

In the above configuration, the boundary between the recessed portion or the projecting portion and the planar portion is a continuous curved surface. Accordingly, the boundary between the recessed portion or the projecting portion and the planar portion can also have a smooth shape in which there is no rapidly changing portion. Therefore, the generation of wrinkles can be further suppressed when deformation in the lateral direction or deformation in the longitudinal direction is performed on the laminate. Hence, the strength of the composite structure can be more favorably improved.

In addition, in the method for manufacturing a composite structure according to one aspect of the present disclosure, a length of the recessed portion or the projecting portion in the longitudinal direction decreases from one side toward the other side in the lateral direction.

In the above configuration, the length of the recessed portion or the projecting portion in the longitudinal direction decreases from the one side to the other side in the lateral direction. Accordingly, as compared to a recessed portion or a projecting portion having a constant length in the longitudinal direction regardless of the position in the lateral direction, a region to be deformed can be more reduced when the recessed portion or the projecting portion is formed in the forming step. Accordingly, the recessed portion or the projecting portion can be easily formed in the forming step.

In addition, the method for manufacturing a composite structure according to one aspect of the present disclosure further includes a dividing step of dividing fibers of the fiber sheets at division portions (31) in the predetermined portion before the forming step, the fibers being arranged along the longitudinal direction.

In the above configuration, the dividing step of dividing the fibers of the fiber sheets in the predetermined portion is provided before the forming step. Accordingly, in the forming step, the predetermined portion of the laminate is easily elongated in the longitudinal direction. Therefore, in the forming step, the recessed portion or the projecting portion can be favorably formed.

In addition, in the method for manufacturing a composite structure according to one aspect of the present disclosure, the laminate includes the plurality of fiber sheets in which the fibers are divided at the division portions in the dividing step, and the division portions are disposed apart from each other in the longitudinal direction not to overlap each other in a lamination direction. The division portions are provided in the recessed portion or in the projecting portion.

In the above configuration, the division portions are disposed apart from each other in the longitudinal direction not to overlap each other in the lamination direction. Accordingly, it is possible to avoid a situation where a plurality of the division portions are disposed on the same cross section in the lamination direction of the laminate. Therefore, a decrease in the strength of the laminate can be suppressed.

In addition, in the method for manufacturing a composite structure according to one aspect of the present disclosure, the recessed portion or the projecting portion has a constant length in the longitudinal direction regardless of a position in the lateral direction.

In the above configuration, the length of the recessed portion or the projecting portion in the longitudinal direction is constant regardless of the position in the lateral direction. Accordingly, even when the division portions are disposed apart from each other in the longitudinal direction, the numbers of the division portions included in the recessed portion or in the projecting portion can be set to the same number at any position in the lateral direction. Therefore, the number of the division portions included in the recessed portion or in the projecting portion can be larger as compared to that of the recessed portion or the projecting portion of which the length in the longitudinal direction decreases from the one side toward the other side in the lateral direction. Hence, the laminate can be favorably elongated in the longitudinal direction in the forming step, so that the recessed portion or the projecting portion can be favorably formed.

Incidentally, the length of the recessed portion or the projecting portion in the longitudinal direction means the length of the recessed portion or the projecting portion in the longitudinal direction in a plan view of the recessed portion or the projecting portion.

In addition, in the method for manufacturing a composite structure according to one aspect of the present disclosure, in the longitudinal deformation step, the laminate is deformed such that a region adjacent to the recessed portion or to the projecting portion in the longitudinal direction moves in a direction opposite to an expanding direction of the curved surface of the recessed portion or of the projecting portion.

In the above configuration, the laminate is deformed such that the region adjacent to the recessed portion or to the projecting portion in the longitudinal direction moves in the direction opposite to the expanding direction of the curved surface of the recessed portion or of the projecting portion. Accordingly, when the laminate is deformed in the longitudinal direction, the tensile force generated in the portion having a large radius of curvature can be more favorably suppressed. Therefore, the compressive force acting on the portion having a small radius of curvature can be suppressed, and the generation of wrinkles can be more favorably suppressed. Hence, the strength of the composite structure can be more favorably improved.

According to another aspect of the present disclosure, there is provided a laminate (2) having a plate shape that is used to form a composite structure (1) in which a cross section in a longitudinal direction has a predetermined shape and a cross section in a lateral direction has a predetermined shape when a predetermined portion of the laminate is deformed, the body including: a plurality of fiber sheets (3) laminated in a thickness direction. A recessed portion (25) or a projecting portion (26) formed by a curved surface is formed in the predetermined portion.

In the above configuration, the recessed portion or the projecting portion formed by a curved surface is formed in the predetermined portion. Accordingly, when the laminate is deformed in the longitudinal direction to manufacture the composite structure, the tensile force generated in the portion having a large radius of curvature can be favorably suppressed. Therefore, the compressive force acting on the portion having a small radius of curvature can be suppressed, and the generation of wrinkles can be more favorably suppressed. Hence, the strength of the composite structure can be more favorably improved.

In addition, since the recessed portion or the projecting portion is formed by a curved surface, a curved surface portion of the recessed portion or of the projecting portion has a smooth shape in which there is no rapidly changing portion. Therefore, the generation of wrinkles can be further suppressed when deformation in the lateral direction or deformation in the longitudinal direction is performed on the laminate. Hence, the strength of the composite structure can be further improved.

The invention claimed is:

1. A method for manufacturing a composite structure, the method comprising:
   a lamination step of molding a laminate having a plate shape by laminating a plurality of fiber sheets;
   a forming step of forming a recessed portion or a projecting portion formed by a curved surface, in a predetermined portion of the laminate;
   a lateral deformation step of providing a predetermined shape to a cross section in a longitudinal direction by deforming the laminate in a lateral direction after the forming step; and
   a longitudinal deformation step of providing a predetermined shape to a cross section in the lateral direction by deforming the laminate in the longitudinal direction to deform the recessed portion or the projecting portion formed in the forming step, after the forming step,
   wherein the recessed portion or the projecting portion has a constant length in the longitudinal direction regardless of a position in the lateral direction, over an entire area in the lateral direction, and the recessed portion and the projecting portion comprise a rectangular shape in a plan view.

2. The method for manufacturing a composite structure according to claim 1,
   wherein the recessed portion or the projecting portion has a sine curve shape.

3. The method for manufacturing a composite structure according to claim 1,
   wherein the laminate includes a planar portion having a flat plate shape, and
   in the forming step, the recessed portion or the projecting portion is formed such that a boundary between the recessed portion or the projecting portion and the planar portion is a continuous curved surface.

4. The method for manufacturing a composite structure according to claim 1,
   wherein in the longitudinal deformation step, the laminate is deformed such that a region adjacent to the recessed portion or to the projecting portion in the longitudinal direction moves in a direction opposite to an expanding direction of the curved surface of the recessed portion or of the projecting portion.

5. The method for manufacturing a composite structure according to claim 1,
   further comprising a dividing step of dividing fibers of the fiber sheets at division portions in the predetermined portion before the forming step, the fibers being arranged along the longitudinal direction, and the longitudinal direction is orthogonal to the lateral direction in a planar view of the laminate.

6. The method for manufacturing a composite structure according to claim 1,
   wherein the laminate includes the plurality of fiber sheets in which the fibers are divided at the division portions in the dividing step, and the division portions provided in the fiber sheets are disposed apart from each other in the longitudinal direction not to overlap each other on a cross section in a lamination direction of the laminate, the lamination direction is orthogonal to the longitudinal direction and the lateral direction, and the division portions are provided in the recessed portion or in the projection portion.

* * * * *